J. J. CHRISTIE.
Improvement in Glass Bottle Molds.
No. 132,897. Patented Nov 12, 1872.
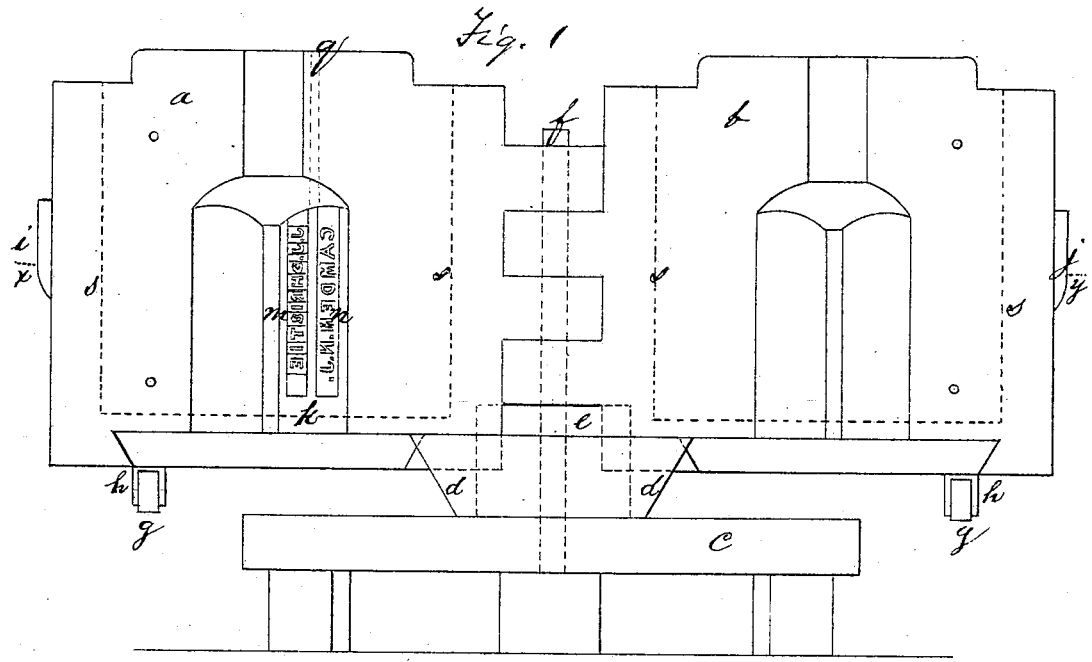
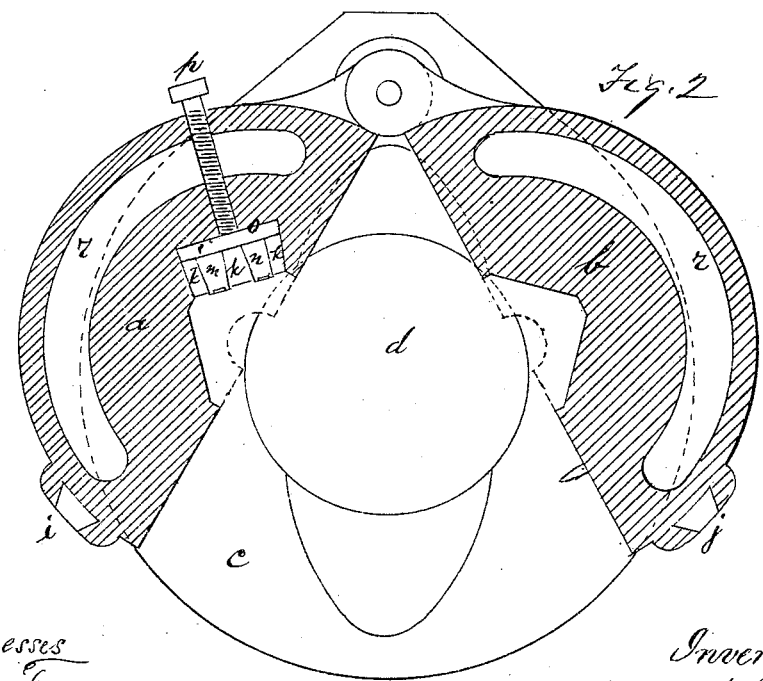
Witnesses
Ed. J. Fasy
W. E. Moore
Inventor:
James J. Christie

UNITED STATES PATENT OFFICE.

JAMES J. CHRISTIE, OF CAMDEN, NEW JERSEY.

IMPROVEMENT IN GLASS-BOTTLE MOLDS.

Specification forming part of Letters Patent No. 132,897, dated November 12, 1872.

*To all whom it may concern:*

Be it known that I, JAMES J. CHRISTIE, of Camden, in the county of Camden and State of New Jersey, have invented Improvements in Glass-Bottle Molds, of which the following is a specification:

My improvements relate to the mold for which Letters Patent No. 72,368 were granted to me December 17, 1867. My improvements consist, first, in providing the movable panel or slide $k$ with recesses and movable dovetailed types or movable dovetailed lettered plates set in said recesses to form any desired inscription on the bottles or other ware formed in the mold; second, in a movable plate, $o$, placed back of the slide $k$ for securing and adjusting the types or lettered plates, said plate $o$ being regulated by a set-screw or several set-screws, as desired; third, in supporting the body composed of the two halves or sides of the mold so as to leave an open space between them and the bed-plate, and thus allow the scales and fine particles of overblown glass to get away without causing wear of the parts or interference with the proper closing of the mold.

In the drawing, Figure 1 represents an elevation of the mold opened, and Fig. 2 a horizontal section on the line $x\ y$ of Fig. 1.

$a$ and $b$ are the two halves or sides of the mold. $c$ is the bed-plate. $d$ is the mold bottom, which is of the usual form. $e$ is a projection, on which the hinges of the mold bear, being flexibly attached thereto by means of the bolt $f$. The projection $e$ constitutes the means of elevating the sides of the mold so as to leave an open space between them and the bed-plate, as shown in Fig. 1. $g$ are friction-rollers, their studs $h$ being screwed into the sides $a$ and $b$, respectively, so as to make the rollers easily adjustable with relation to the bed-plate. $i$ and $j$ are sockets for the mold-handles, which are detachable and secured in their sockets by thumb-screws or their equivalents. $k$ is the movable panel or slide, in which I form one or two or more dovetailed recesses as sockets for types, such as $m$, or lettered plates, such as $n$, Fig. 1. $o$, Fig. 2, is a movable plate at the back of panel $k$. It holds the types or lettered plates in position, and is caused to adjust the types or lettered plates more or less toward the cavity of the mold by a thumb-screw, $p$, or several thumb-screws, if desired, inserted through the side of the mold. $q$ is an aperture in the side, through which a punch or other suitable implement is inserted to facilitate the removal of the back plate $o$ and panel $k$ from their sockets. $r$ are cavities or recesses formed in the sides $a$ and $b$ to admit air or hold water or other liquid for cooling the mold. The recesses are open at the top and extend down into the mold, preferably to about the depth indicated by dotted lines $s$ in Fig. 1.

When the mold is in use the water is introduced while the mold is open for the removal of the ware.

It is not material that the cavities $r$ have any particular shape or size, but I prefer making them as large as they can be made without weakening the mold.

It is obvious that types alone may be employed, as described, or lettered plates alone, or both combined.

In lieu of friction-rollers $g$, lugs might be used, but with less advantage.

The types and lettered plates are shown to be applied to one half or side of the mold; but they may be applied, as described, to both sides $a$ and $b$, if desired.

The mold is intended for forming and lettering articles of glass-ware other than bottles, the necessary changes being made in the form of the inclosed cavity.

I claim—

1. The movable panel $k$, in combination with the types, lettered plate or plates, both or either, for forming inscriptions on the ware, substantially as set forth.

2. The movable plate $o$ and its adjusting screw or screws, in combination with the panel $k$ to secure and adjust the types or lettered plate or plates employed, substantially as set forth.

3. The projection $e$, or its equivalent, in combination with the friction-rollers $g$, or their equivalents, for elevating and supporting the sides $a$ and $b$ of the mold above its base, and thus allow the fine particles of glass which would interfere with the closing of the mold to escape, substantially as set forth.

JAMES J. CHRISTIE.

Witnesses:
 THOS. A. BURTT,
 WM. E. MOORE.